United States Patent
Renyer et al.

(10) Patent No.: US 9,038,861 B2
(45) Date of Patent: May 26, 2015

(54) SEED METERING WHEEL ASSEMBLY (71) Applicant: USC, L.L.C., Sabetha, KS (US)

(72) Inventors: Jim Renyer, Sabetha, KS (US); Greg Renyer, Sabetha, KS (US)

(73) Assignee: USC, L.L.C., Sabetha, KS (US)

( * ) Notice: Subject to any disclaimer, the term of this patent is extended or adjusted under 35 U.S.C. 154(b) by 13 days.

(21) Appl. No.: 13/903,957

(22) Filed: May 28, 2013

(65) Prior Publication Data
US 2014/0263434 A1    Sep. 18, 2014

Related U.S. Application Data

(63) Continuation-in-part of application No. 13/830,083, filed on Mar. 14, 2013.

(51) Int. Cl.
*B67D 7/06*    (2010.01)
*B65G 65/48*    (2006.01)
*B65D 88/54*    (2006.01)
*A01C 17/00*    (2006.01)

(52) U.S. Cl.
CPC ............ *B65G 65/4872* (2013.01); *B65D 88/54* (2013.01); *A01C 17/00* (2013.01)

(58) Field of Classification Search
CPC .................................. G01F 11/10; B67D 7/06
USPC ............ 239/650; 222/181.1, 185.1, 235–236, 222/352, 365, 448–451, 453, 482, 485, 452
See application file for complete search history.

(56) References Cited

U.S. PATENT DOCUMENTS 4,376,601 A * 3/1983 Laseter ............................ 406/64
4,465,017 A    8/1984 Simmons
4,609,153 A * 9/1986 van der Lely ................. 239/665
4,785,976 A * 11/1988 Bennie et al. ................. 222/370
5,244,129 A * 9/1993 Poussin et al. ................ 222/410
5,887,610 A    3/1999 Verbockhaven
6,551,402 B1    4/2003 Renyer et al.
6,588,685 B2 * 7/2003 Woodruff et al. ............. 239/650

(Continued)

FOREIGN PATENT DOCUMENTS

JP    2010096539 A1    4/2010

OTHER PUBLICATIONS

Bayer CropScience Catalog. 2012. Available on line at: http://www.bayercropscience.us/products/seed-treatment-equipment/Documents/SeedTreatmentMachinery2012_Catalog.pdf.

*Primary Examiner* — Paul R Durand
*Assistant Examiner* — Andrew P Bainbridge
(74) *Attorney, Agent, or Firm* — Hovey Williams LLP (57) ABSTRACT

An improved seed metering wheel assembly is provided to deliver a substantially constant flow of seed to a downstream treating device or the like, without any substantial surging of seeds. The seed metering wheel assembly includes an axially rotatable metering wheel having a plurality of strategically sized and arranged seed metering openings therethrough, arranged in circular arrays of differently sized metering openings. In another embodiment, the seed metering wheel includes a central hub section and an outermost rib, with a series of ribs between the hub section and rim, which lie along respective non-diameter chords. Incoming seed is delivered from a seed hopper outlet by gravitation to the metering wheel, which preferably provides a substantially constant open area while preventing wholly unobstructed flow of seeds.

19 Claims, 11 Drawing Sheets

(56) References Cited

U.S. PATENT DOCUMENTS

| | | |
|---|---|---|
| 6,783,082 B2 | 8/2004 | Renyer et al. |
| 7,255,680 B1 | 8/2007 | Gharib |
| 7,536,962 B2 | 5/2009 | Eastin et al. |
| 8,019,478 B2 | 9/2011 | Whitehurst et al. |
| 8,265,597 B2 | 9/2012 | Smith et al. |
| 8,306,721 B2 | 11/2012 | Maruyama |
| 8,404,117 B1 | 3/2013 | Steinbrueck et al. |
| 2006/0255060 A1 | 11/2006 | Miller |
| 2007/0225934 A1 | 9/2007 | Moriya et al. |
| 2010/0316446 A1 | 12/2010 | Runyon |
| 2011/0061418 A1 | 3/2011 | Ishihara et al. |
| 2011/0144882 A1 | 6/2011 | Bidner et al. |
| 2011/0217474 A1 | 9/2011 | McGough |
| 2012/0111412 A1 | 5/2012 | Satake |
| 2012/0183675 A1 | 7/2012 | Reineccius et al. |
| 2012/0189762 A1* | 7/2012 | Reineccius et al. ............ 427/4 |
| 2012/0192542 A1 | 8/2012 | Chillar et al. |
| 2012/0221259 A1 | 8/2012 | Yokohata |

* cited by examiner

SEED METERING WHEEL ASSEMBLY

CROSS-REFERENCE TO RELATED APPLICATION

This application is a continuation-in-part of application Ser. No. 13/830,083, filed Mar. 14, 2013, which is incorporated by reference herein in its entirety.

BACKGROUND OF THE INVENTION

1. Field of the Invention

The present invention is concerned with improved seed metering wheel assemblies, which substantially eliminate surges of seed during operation of a seed treater. More particularly, the invention is concerned with such wheel assemblies, and corresponding methods, wherein a rotatable metering wheel assembly is located beneath a seed hopper and has strategically sized and oriented metering openings therethrough. The openings are preferably of different sizes and are arranged in circular arrays so that a substantially constant volumetric and weight output flow of seeds is achieved.

2. Description of the Prior Art

Coating of agricultural seeds is a common practice in sophisticated farming operations. Thus, seeds have been coated with herbicides, fungicides, absorbents, fertilizers, or other chemicals. Generally, specialized seed treaters are used for these purposes and include an inlet hopper, a seed coating device, and a downstream rotatable dryer. A seed metering device is usually provided between the seed hopper and seed coating device, in an effort to give a substantially constant output flow of seeds to the coating device. However, some prior seed metering devices are prone to surging and inconsistent seed flow, which can lead to over- and undercoating of seeds. The problem of seed surging is significant because the usage rate of coating materials normally does not vary once the treater reaches a steady state condition. Accordingly, when a surge occurs, the quantity of seed delivered to the coater is not matched with the supply and application rates of the coating chemicals. Therefore, the seed treater necessarily produces substantial quantities of under-coated seeds.

U.S. Pat. No. 4,465,017 describes a seed coating device having a typical seed metering wheel of spoked design in the form of a circular, axially rotatable wheel having a series of radial spokes extending from a central hub to the rim of the wheel. Metering wheels of the type described in the '017 patent are subject to surging in instances where an unobstructed flow path is presented, which allows a greater rate of seed flow to the downstream coating apparatus.

In order to ameliorate the effects of seed surging, downstream flow-equalizing devices have been employed, which significantly improve the operation of simple seed wheels. However, these accessories add expense and complexity to the metering equipment.

There is accordingly a need in the art for an improved seed metering wheel assembly which is capable of delivering substantially constant flows of seed over a given time period by the essential elimination of undesirable seed surging, without the need for downstream flow equalization devices.

SUMMARY OF THE INVENTION

The present invention overcomes the problems outlined above, and provides improved seed metering wheel assemblies operable to deliver substantially constant flows of seed over a seed treatment time period of at least about 30 minutes. Broadly, the seed treaters of the invention each include a hopper assembly including a lower seed outlet opening of predetermined shape and size, so that the hopper assembly is operable to hold a supply of seeds and to deliver by gravitation quantities of the seed to the seed outlet opening over the time period. An axially rotatable seed metering wheel assembly is located beneath the seed outlet opening of the hopper and is oriented to receive the quantities of seed and to create a substantially uniform output flow of the seeds. The rotatable metering wheel forming a part of the overall assembly includes a plurality of seed metering openings therethrough and defined by corresponding rib sections. In one embodiment, the rib sections and openings are oriented to present a substantially constant open area beneath the hopper seed outlet opening over the coating period, with at least certain portions of the seed metering opening-defining ribs extending across the seed outlet opening over substantially all of the coating period, in order to prevent wholly unobstructed flow of seeds from the seed outlet opening through the seed metering wheel assembly. Advantageously, at least certain of the seed metering openings are of a size different than the size of others of the seed metering openings. The seed metering openings may be located in a plurality of individual circular arrays each having identically sized openings within the array. Alternately, the seed metering wheel comprises a central hub section, a circular rim outboard of said central hub section, and a series of ribs extending between said central hub section and said rib and defining through-openings, said ribs lying along respective, spaced apart, non-diameter chord lines.

The invention also provides methods for metering quantities of seed by delivering through gravitation quantities of seed from a seed outlet opening to a metering station having a seed metering wheel in accordance with the invention. At the metering station, successive quantities are passed through a series of seed metering openings defined by corresponding rib sections and rotating about an axis, so that the rib sections and seed metering openings present a substantially constant open area during seed metering, and with at least certain portions of the seed metering opening-defining ribs extending across said seed metering openings in order to prevent wholly unobstructed flow of seeds from the outlet opening and through the seed metering openings.

As used herein, a "substantially constant open area" refers to maintaining, at substantially all times, a predetermined open area A, and up to plus or minus 10% of A (more preferably plus or minus 5%), through the seed metering wheel assembly. For example, if a predetermined open area is 10 square inches, a substantially constant area would be from 9-11 square inches. In like manner, a "substantially constant" flow of seeds from the seed metering wheel assembly would encompass a preselected flow rate F and plus or minus 10% of F (more preferably plus or minus 5%).

DETAILED DESCRIPTION

Embodiment of FIGS. 1-9 with Seed Metering Wheel 100

Figure 1:
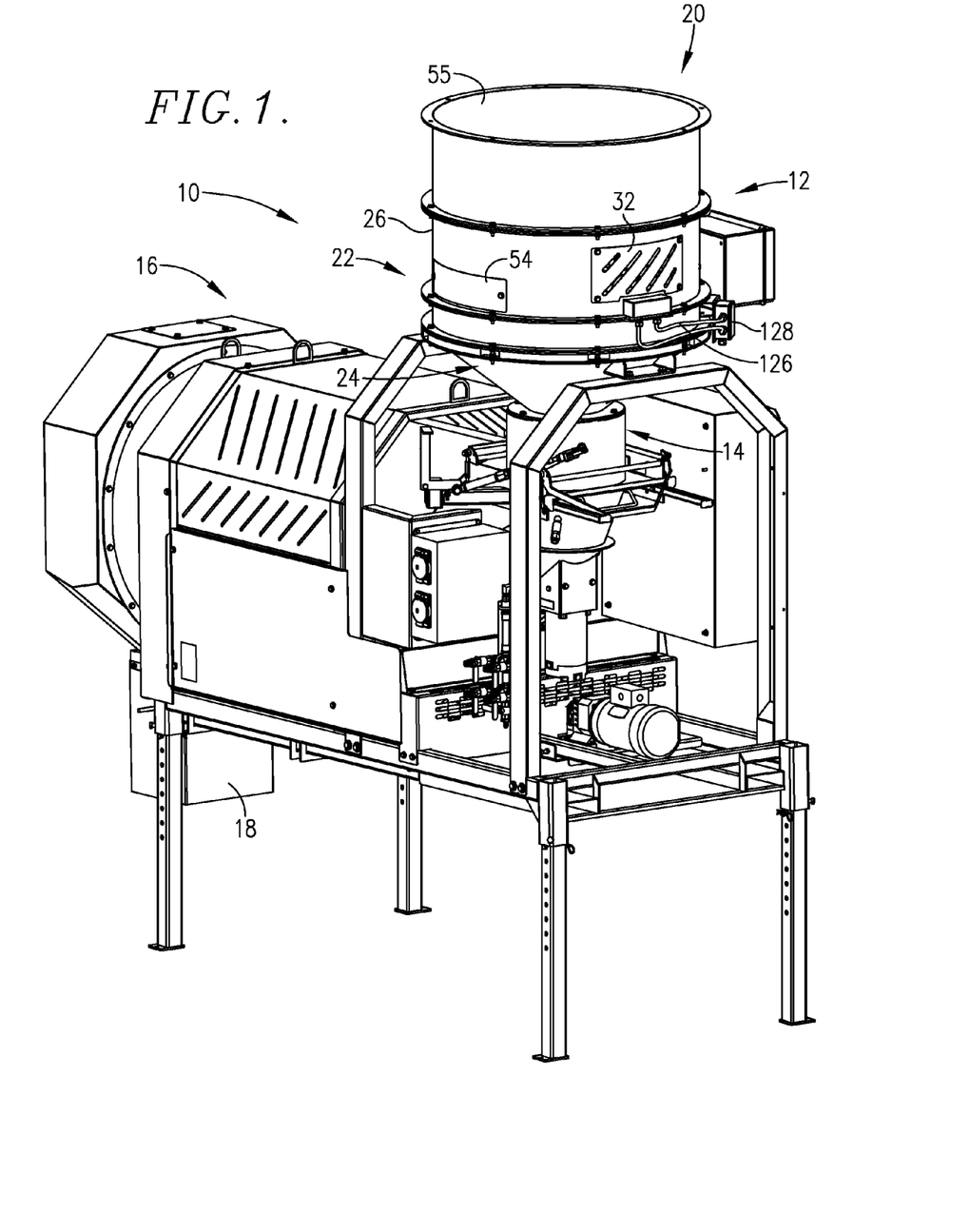
FIG. 1 is a perspective view of a seed treater apparatus having the seed metering wheel assembly of the invention mounted thereon.
Figure 2:
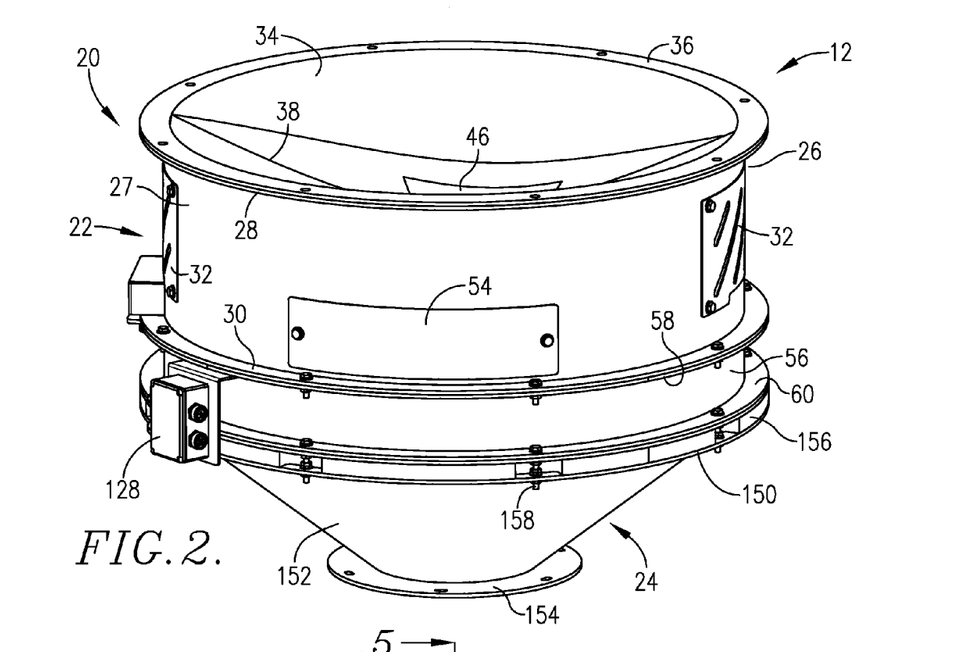
FIG. 2 is a perspective view of the seed metering wheel assembly and seed delivery shoot forming a part of the seed treater apparatus.
Figure 3:
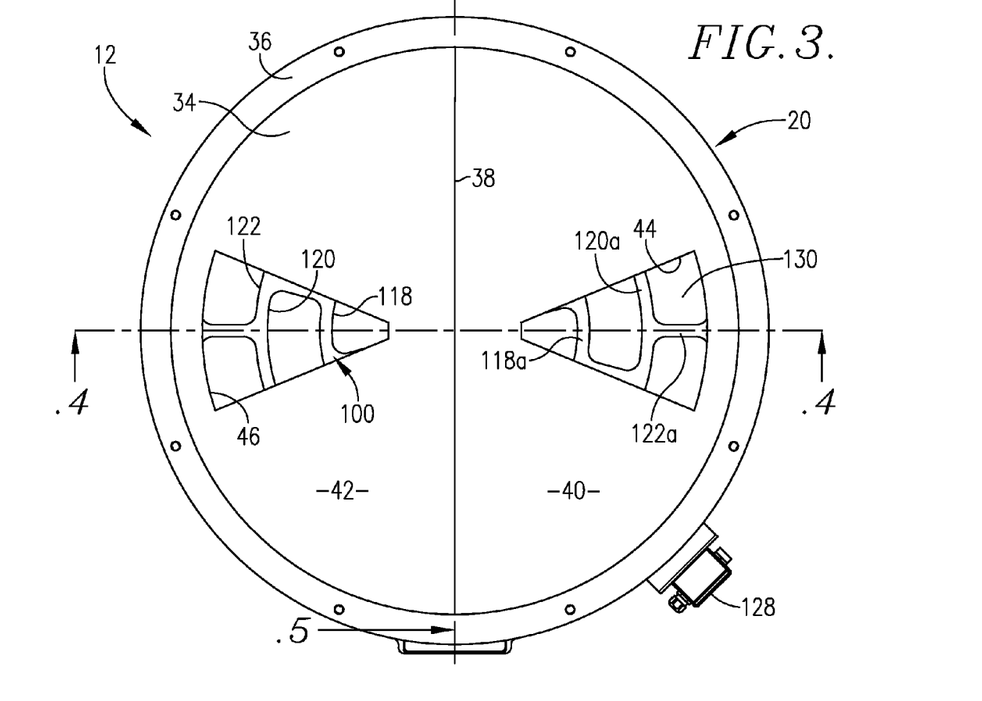
FIG. 3 is a plan view of the apparatus illustrated in FIG. 2.

Turning now to the drawings, a complete seed treater 10 is depicted in FIG. 1 and is equipped with a seed metering wheel assembly 12 in accordance with the invention. Generally speaking, the treater 10 is designed to receive incoming quantities of seed, to apply one or more chemicals onto the surfaces of the seeds, and to thereupon dry the seeds. The illustrated seed treater 10 has the assembly 12 which directs seed into an atomizer 14 where the seeds are coated with chemical(s). The preferred atomizer is described in U.S. Pat. Nos. 6,551,402 and 6,783,082, incorporated by reference herein. The coated seeds are then dried within a downstream rotating drum dryer 16, and the finished seeds are delivered by way of outlet 18 for storage or use.

The seed metering wheel assembly 12 broadly includes an uppermost hopper assembly 20, an intermediate metering assembly 22, a lower plate assembly 23, and a lowermost delivery chute 24, which is secured to the inlet end of atomizer 14.

The hopper assembly 20 includes a housing 26 having an upright tubular sidewall 27, circular upper and lower connection flanges 28 and 36, a pair of opposed vents 32, and a series of removable access plates 54. A unitary seed-receiving hopper 34 having a connection flange 36 is positioned within the confines of housing 26, such that the flanges 36 and 30 mate and are connected via fasteners (not shown). The hopper 34 has an arcuate center line apex 38 with identical, downwardly extending, arcuate wall sections 40 and 42 each equipped with an identical, generally triangularly-shaped seed outlet opening 44 or 46; the latter have downwardly extending, defining wall structures 48 or 50. If desired, a tubular extension 55 (FIG. 1) may be attached to the upper end of housing 26 in order to increase the effective volume of the hopper assembly 20.

The seed metering assembly 22 is positioned below hopper assembly 20 and includes a stationary, tubular housing 56 with upper and lower connection flanges 58 and 60. The upper flange 58 of housing 56 mates with lower flange 30 of assembly 20, with appropriate fasteners serving to connect the flanges. The housing 56 supports a stationary channel 62, which in turn supports an electrical drive motor 64 and gear box 66. The channel 62 also supports a pair of outboard brackets 68 and 70 at the central region thereof. A pair of identical, generally triangular weldments 71 are respectively connected to the brackets 68 and 70 and extend outwardly and are supported by the housing 56. The weldments 71 each include a pair of diverging box sidewalls 72, 74 and 80, 82, as well as an outboard spacer 75 or 83, and fasteners 76, 78 or 84, 86. Seed sensors 88 and 90 are respectively connected with box sidewalls 72 and 80. A lowermost, radially extending brush 92 is secured to sidewall 74, and an identical brush 94 is secured to sidewall 82. It will be observed that the weldments 71 each define a substantially triangular through-opening 96 or 98, and are respectively in registry with the seed outlet openings 44 and 46 of hopper assembly 20. It will thus be appreciated that the openings 96, 98 are seed entrance openings for the metering assembly 22.

The overall metering assembly 22 also includes an axially rotatable metering wheel 100, which is situated within the confines of housing 56. The wheel 100 is of composite design (see FIG. 8) and has a series of interconnected, apertured plates, namely an upper synthetic resin wheel plate 102, an intermediate stainless steel reinforcing plate 104, and a lower synthetic resin plate 106. A circumscribing, upwardly extending seed retaining ring 108 surrounds the apertured plates and extends above the upper surface of plate 102. The interconnected plates 102-106 have a central, hexagonal drive opening 109 and a series of seed metering openings 110 therethrough. In detail, the openings 110 are arranged in a total of three circular arrays 112, 114, and 116. The inner array 116 has a plurality of identical, truncated triangular through-openings 118; the intermediate array 114 has a plurality of identical, elongated, arcuate openings 120, which are in staggered relationship relative to the openings 118. Finally, the outer array 112 has another series of identical, elongated arcuate openings 122, which are staggered relative to the openings 120 of the intermediate array. It will further be observed that the openings 118, 120, and 122 are each defined by circumscribing rib sections 118a, 120a, and 122a.

Figure 4:
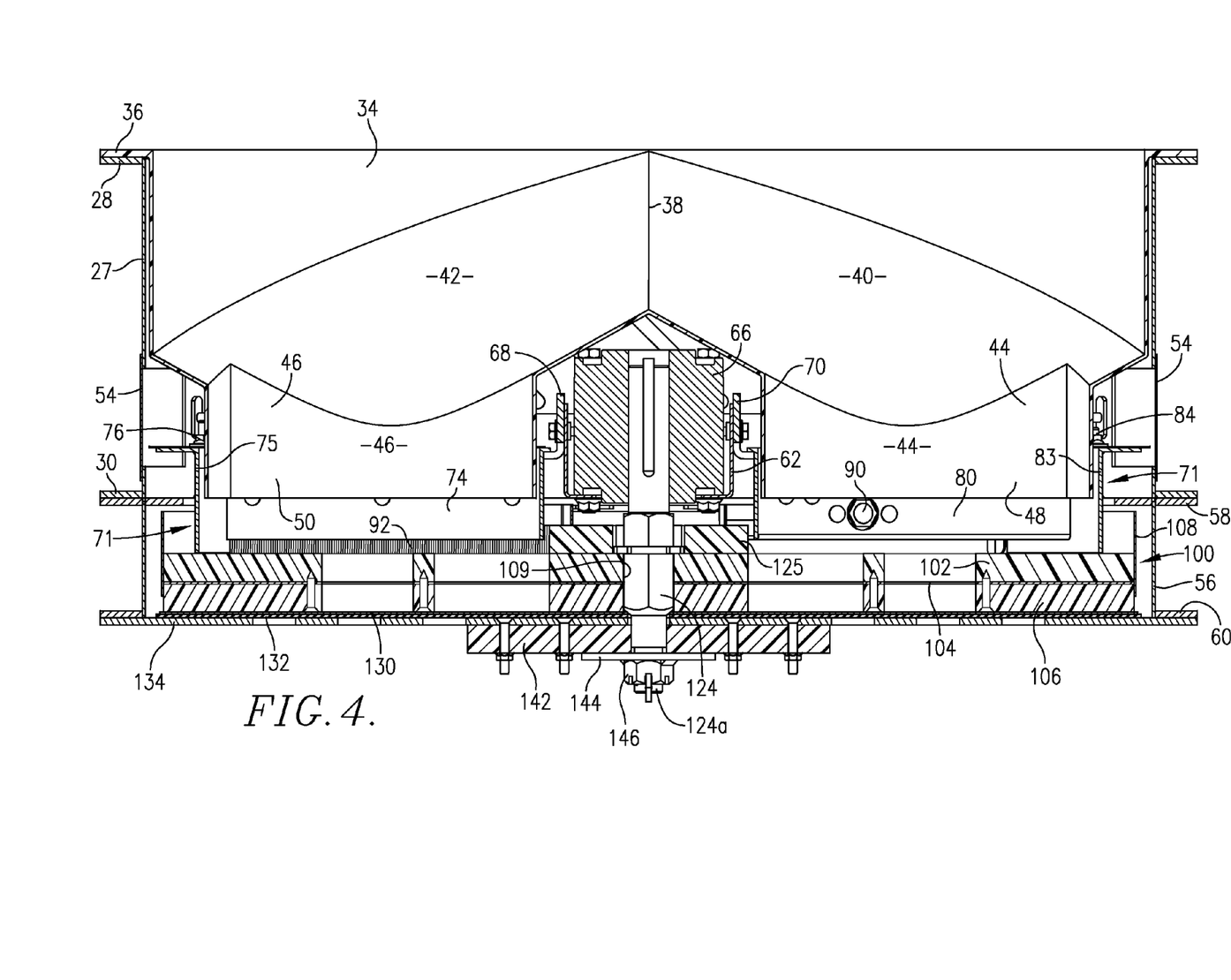
FIG. 4 is a vertical sectional view taken along the line 4-4 of FIG. 3.
Figure 5:
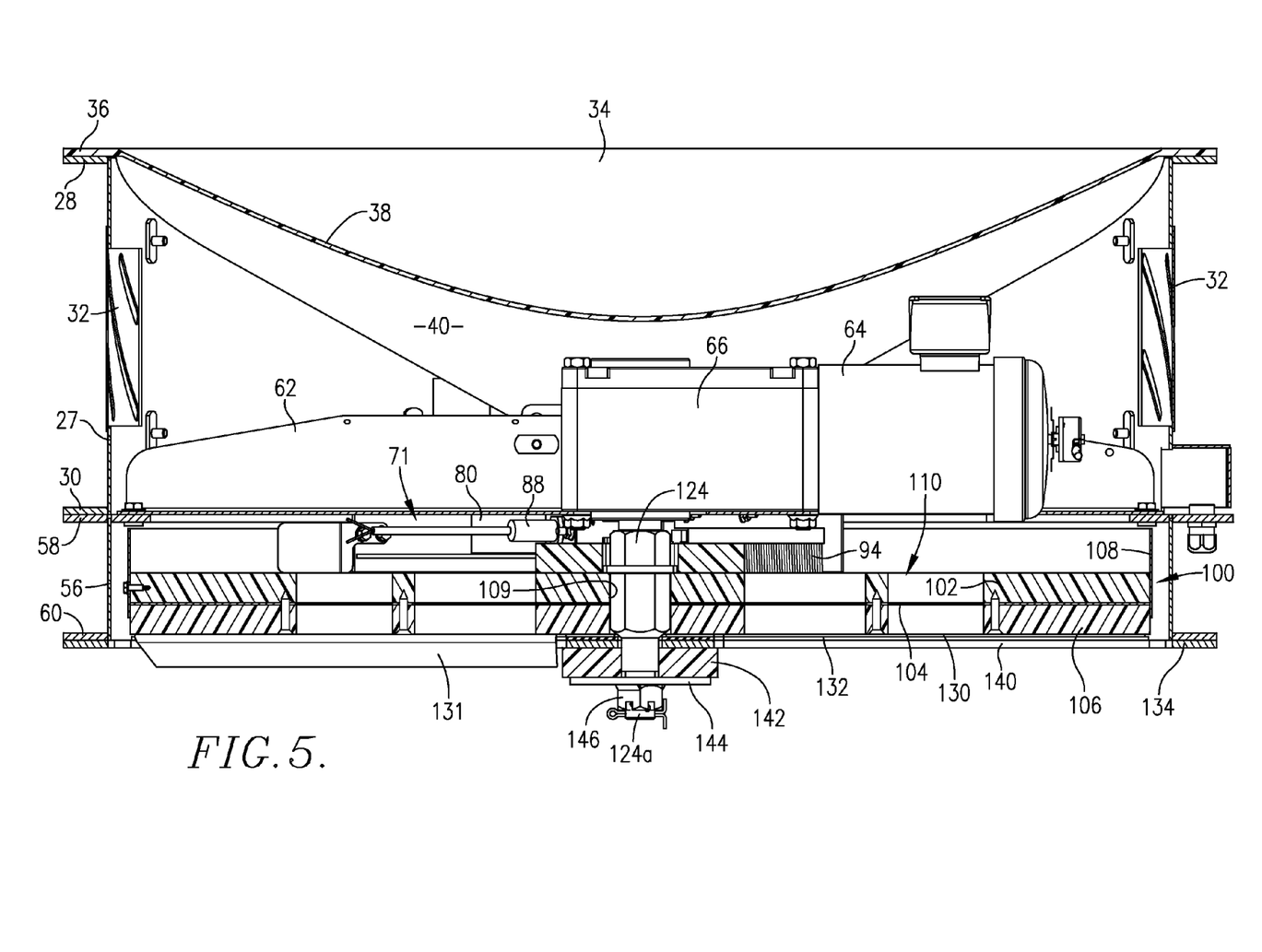
FIG. 5 is a vertical sectional view taken along the line 5-5 of FIG. 3.
Figure 6:
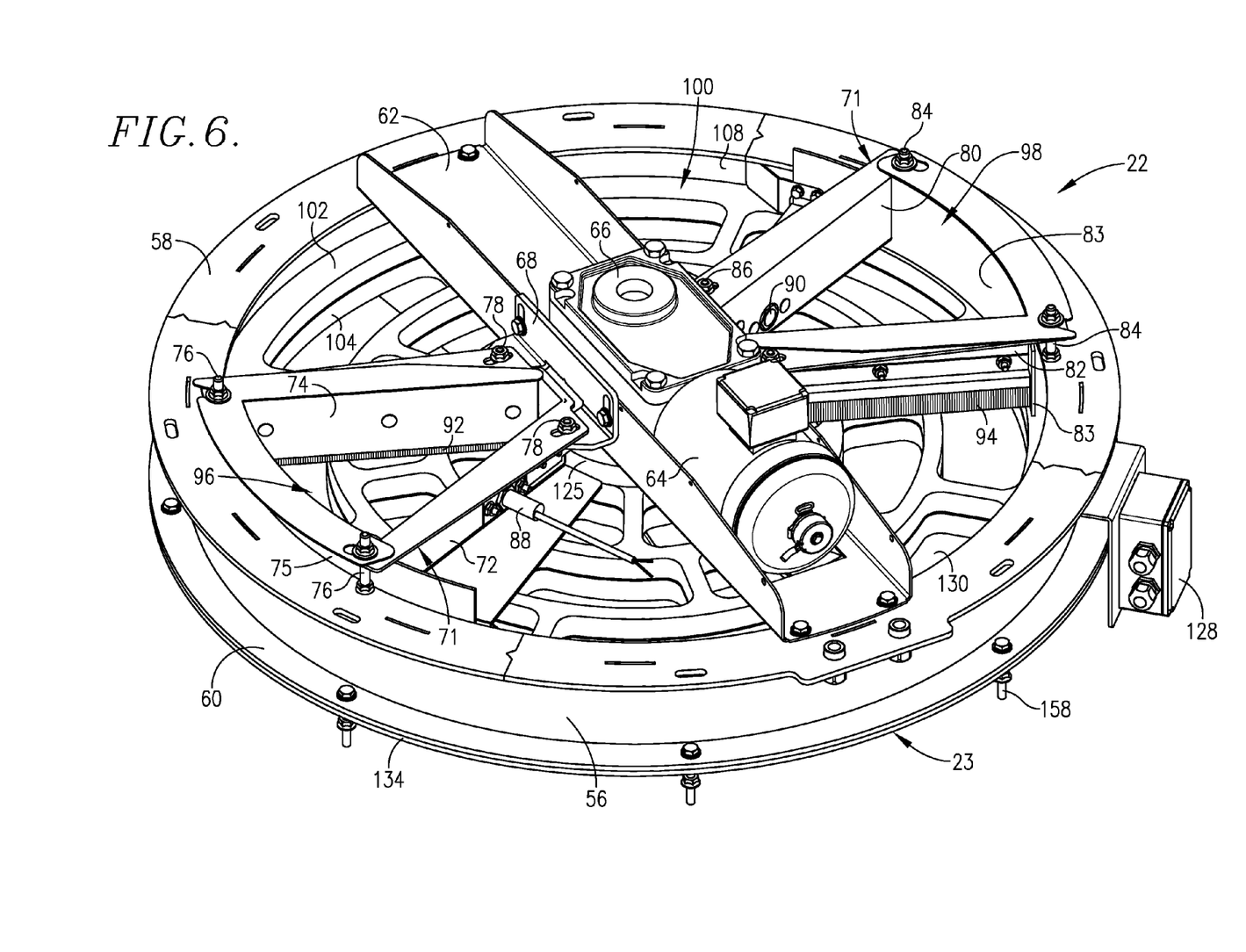
FIG. 6 is a top perspective view of the preferred seed metering wheel assembly of the invention.
Figure 7:
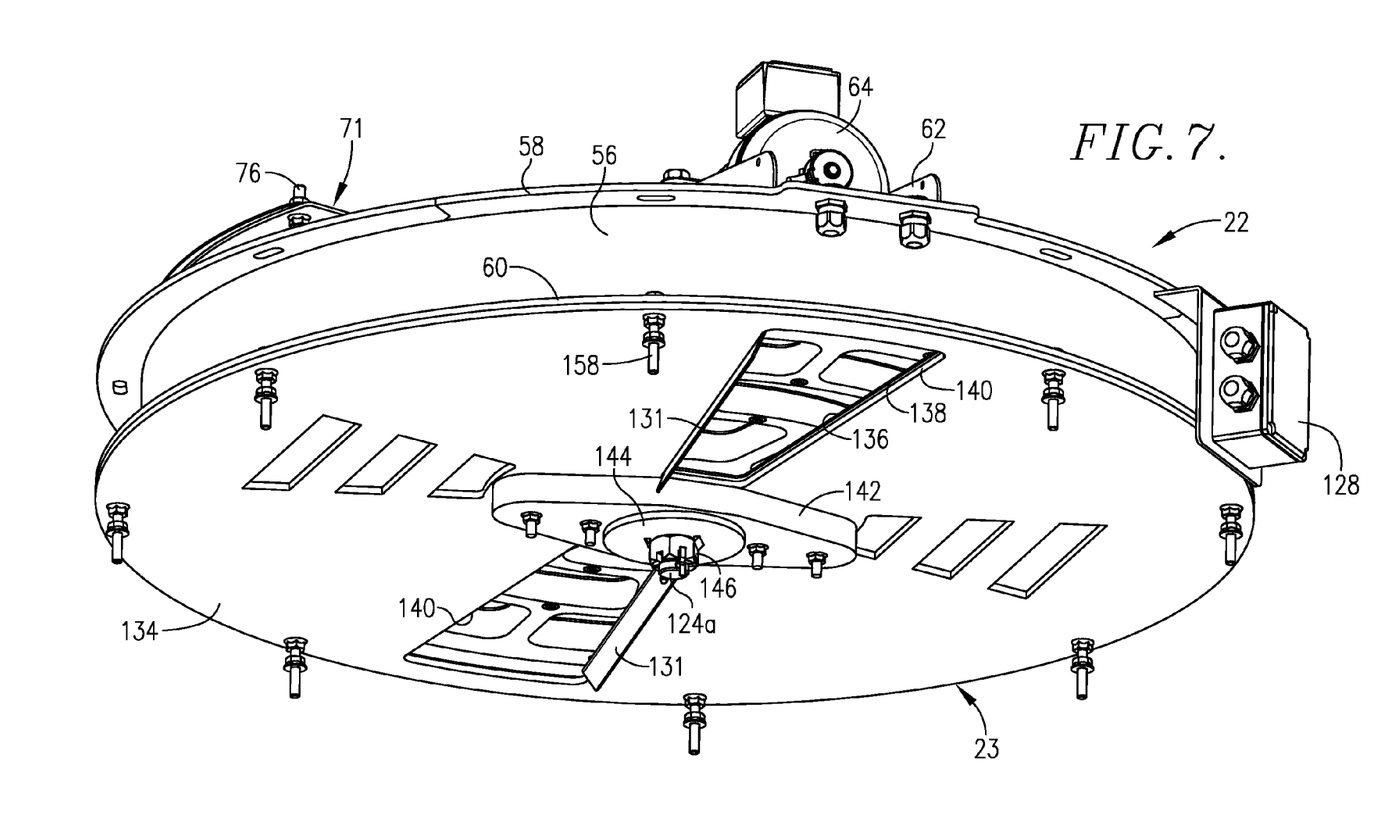
FIG. 7 is a bottom perspective view of the seed metering wheel assembly illustrated in FIG. 6.
Figure 8:
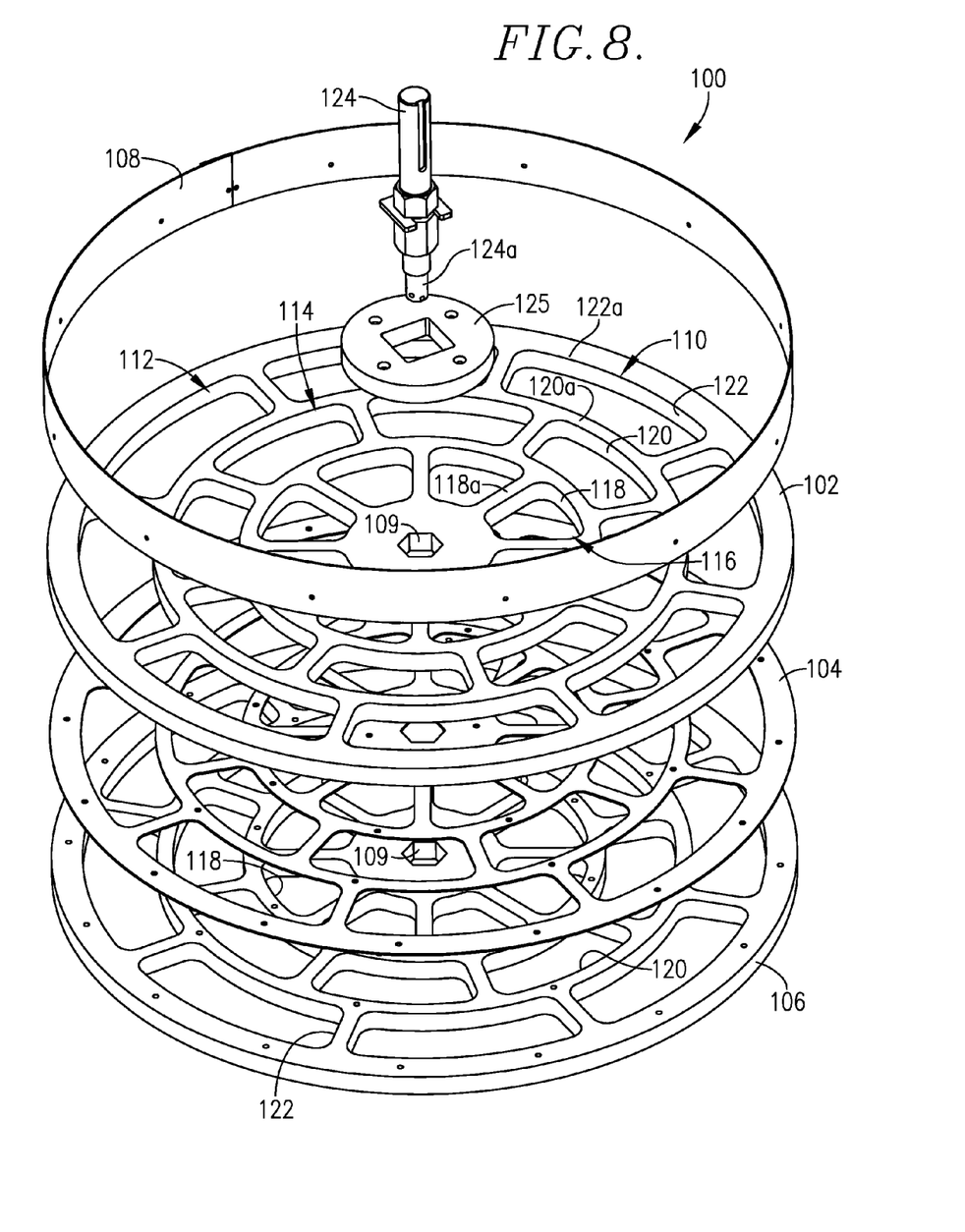
FIG. 8 is an exploded perspective view of the seed metering wheel assembly.
Figure 9:
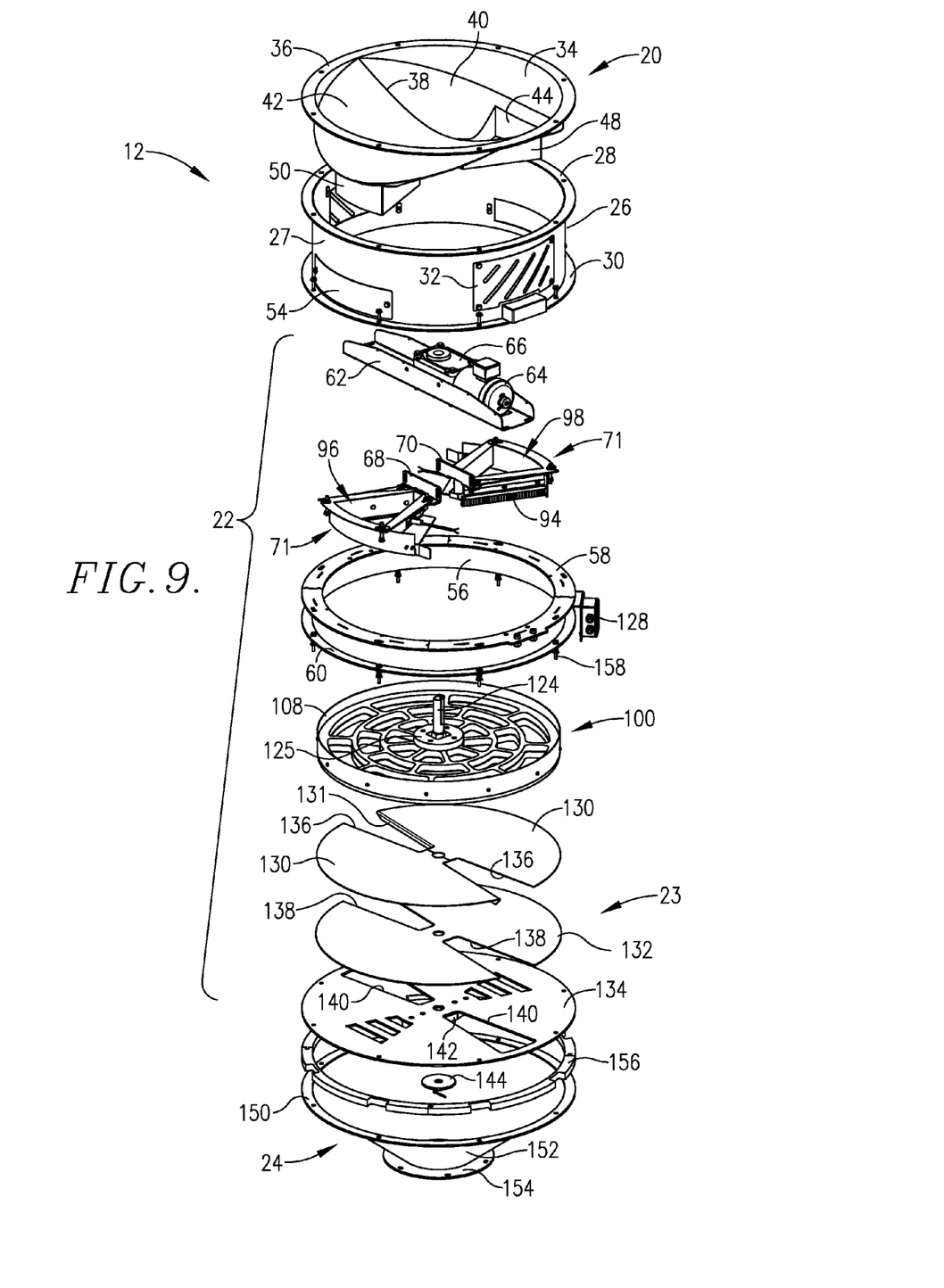
FIG. 9 is an exploded perspective view of the apparatus depicted in FIGS. 2-5.
Figure 10:
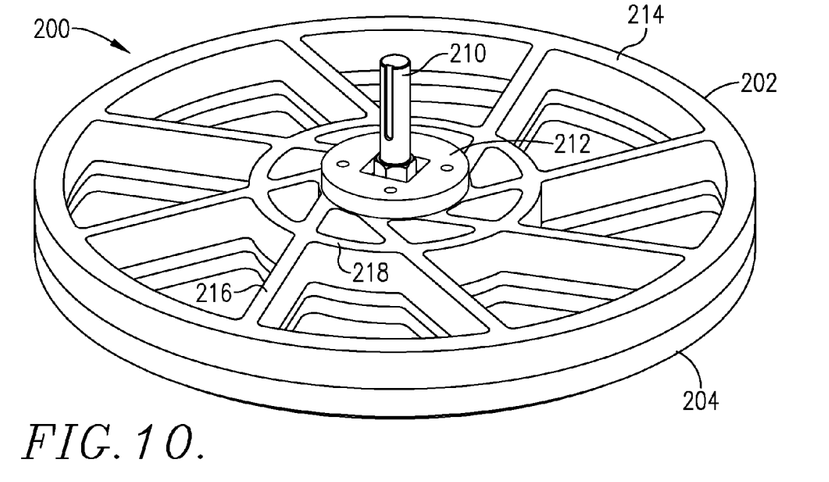
FIG. 10 is a perspective view of another seed metering wheel design in accordance with the invention.
Figure 11:
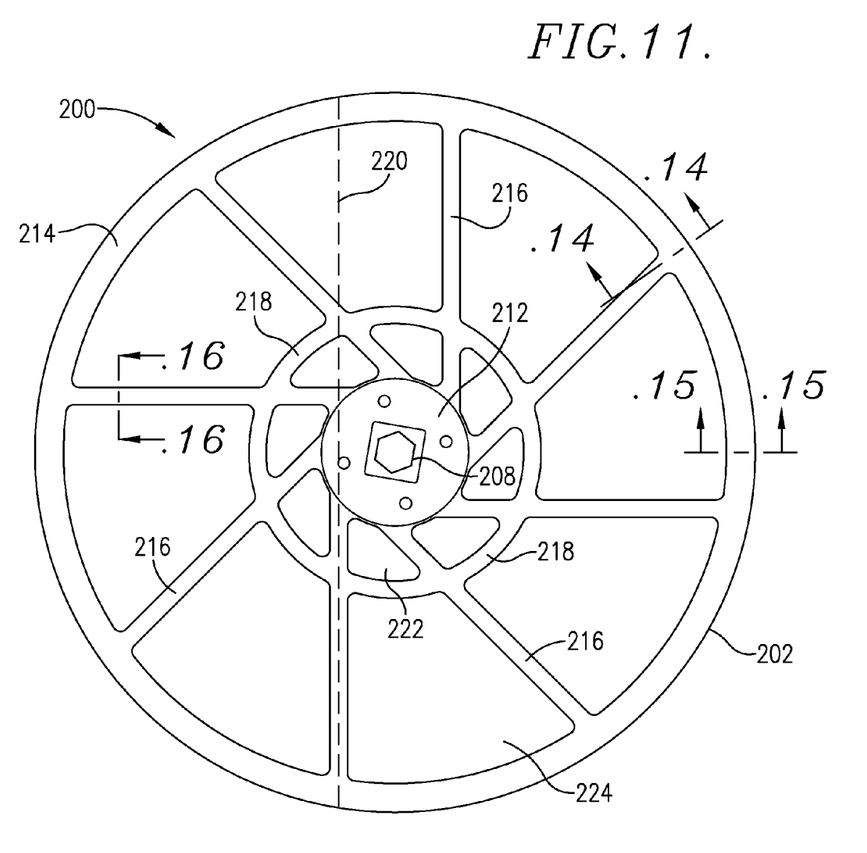
FIG. 11 is a plan view of the seed metering wheel of FIG. 10.
Figure 12:
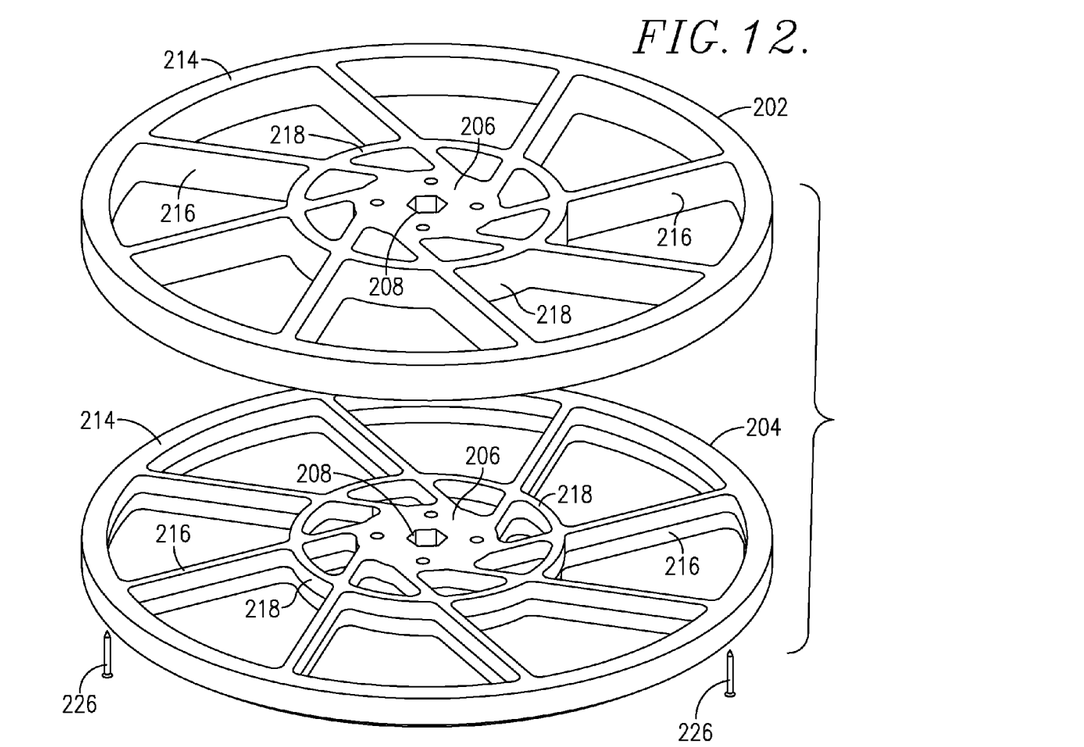
FIG. 12 is an upper, perspective, exploded view depicting the components of the seed metering wheel of FIG. 10.
Figure 13:
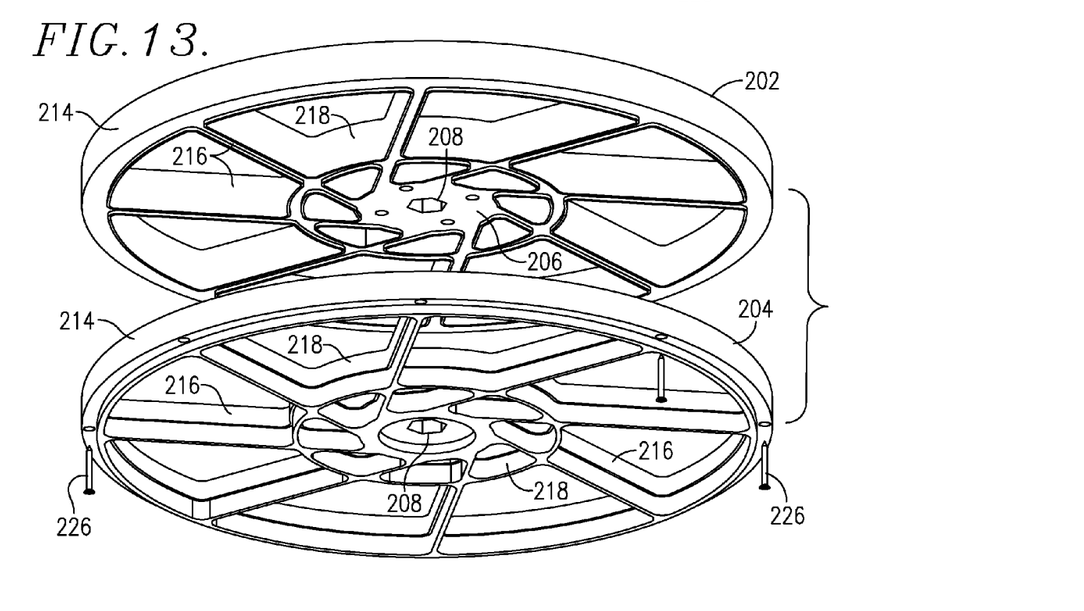
FIG. 13 is a lower, perspective, exploded view depicting the components of the seed metering wheel of FIG. 10.
Figure 14:
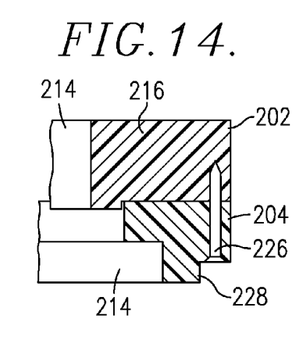
FIG. 14 is a vertical sectional view taken along the line 14-14 of FIG. 11.
Figure 15:
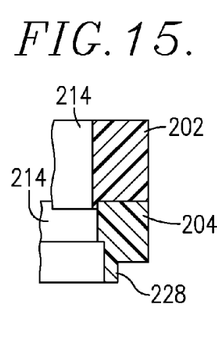
FIG. 15 is a vertical sectional view taken along the line 15-15 of FIG. 11.
Figure 16:
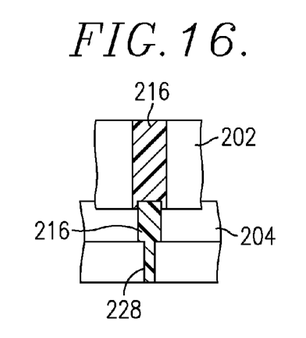
FIG. 16 is a vertical sectional view taken along the line 16-16 of FIG. 11.
Figure 17:
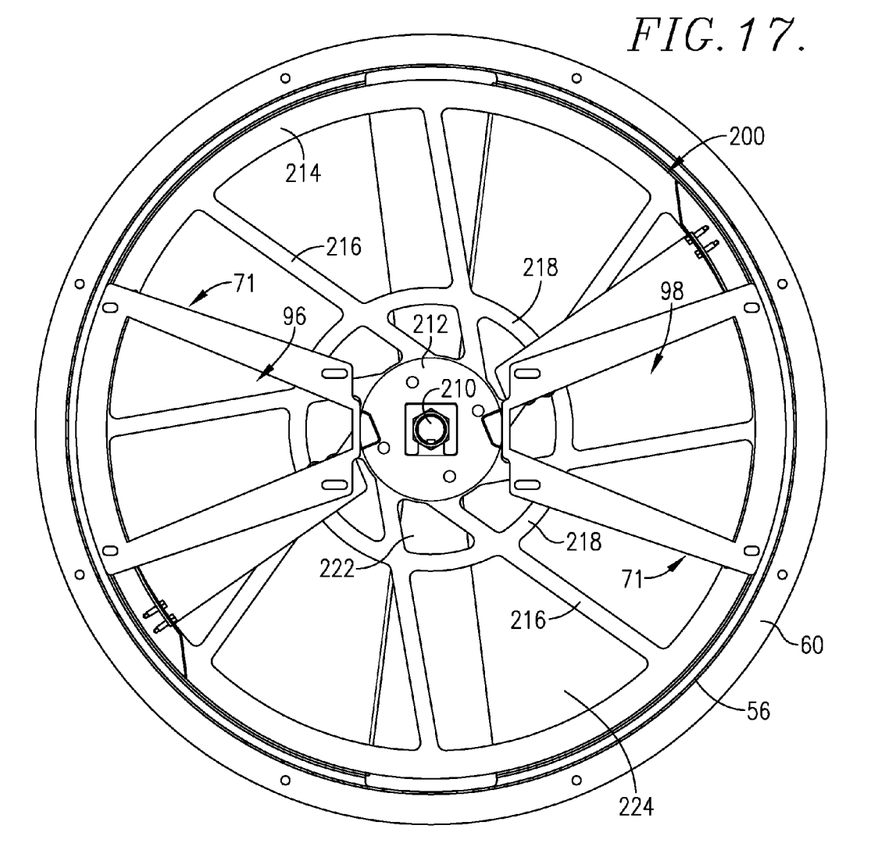
FIG. 17 is a top view illustrating the seed metering wheel of FIG. 10 within the overall metering assembly.

The metering wheel 100 is rotated in a clockwise direction, as viewed in FIG. 4, by means of the motor 64 and gear box 66. The box 66 has an elongated, hexagonal, vertically extending, rotatable drive shaft 124 with a lowermost, downwardly extending threaded shank 124a extending below the wheel 100. The shaft 124 and hub 125 serve to rotate the wheel 100, with the shaft 124 received within the central drive opening 109. The operation of motor 64 is controlled by means of conventional wiring including electrical leads 126 and junction box 128 connected to a digital controller (not shown).

Plate assembly 23 is stationary and includes an upper metallic wear plate 130 which engages the lower surface of wheel 100, a synthetic resin foam support pad 132, and a lowermost metallic floor plate 134. The plates 130 and 132 have identical, opposed, outwardly diverging slots 136 and 138, whereas plate 134 has similarly configured through-openings 140. The wear plate 130 has a pair of downwardly extending flanges 131 adjacent the edges of openings 136, which direct seed downwardly as the seed exits the assembly 23. The assembly 23 is mounted on shank 124a, and an elongated bearing plate 142, washer 144, and nut 146 are used to mount the assembly 23.

The delivery chute 24 is generally frustoconical and has an uppermost connection flange 150, a tapered hollow body section 152 and a lowermost connection flange 154. The flange 150 is connected to the underside of the plate assembly 23 (with optional use of a spacer ring 156) by means of elongated connectors 158.

As is evident from the foregoing description, the seed metering wheel assembly 12 provides a hopper for receiving seeds to be treated, with the seeds flowing by gravitation through the seed outlet openings 44 and 46, and then through the underlying weldment openings 96 and 98 where the seeds encounter the metering wheel 100. After passage through the metering wheel 100, the seeds pass through the stationary openings 136, 138, and 140 of plate assembly 23, and are finally directed into and through the delivery chute 24 to the atomizer 14 of treater 10.

The passage of seed through the metering wheel 100 is of prime importance. That is, as the wheel 100 rotates, the especially designed and configured seed metering openings 118, 120, and 122, and the corresponding opening-defining rib sections 118, 120*a*, and 122*a* continually present a substantially constant open area. That is to say, at virtually every each instant over a given time period, the wheel 100 gives an effective through-opening, which is of substantially constant area. Furthermore, owing to the preferred, differently sized openings 118-122, the staggered orientation thereof, and the locations of the defining rib sections 118*a*-122*a*, at no instant is there a wholly unobstructed seed flow path through the wheel 100. As such, the tendency of prior spoke-type seed metering wheels to cause a buildup of seed, followed by presentation of a completely unobstructed seed flow path with consequent surging or "dumping" of seed, is substantially eliminated. The presence of the stationary brushes 92 and 94 assists in the desirable operation of the metering wheel 100, by acting as a leveling device in order to successively level the upper surfaces of quantities of seeds retained by the ring 108, so that substantially constant seed weights are present at the inlet face of the metering wheel 100. Consequently, the seed metering wheel assembly 12 of the invention provides a substantially constant weight and volumetric flow of seed to the downstream seed treater.

Embodiment of FIGS. 10-17 with Seed Metering Wheel 200

Turning to FIGS. 10-16, a seed metering wheel 200 is depicted. The wheel 200 has a different design as compared with the previously described seed metering wheel 100, and is configured for use within the overall seed metering assembly 22. The wheel 200 is a simpler design which can be manufactured at a lower cost as compared with wheel 100.

In particular, the wheel 200 is of composite design, comprising upper and lower, interconnected, synthetic resin wheel plates 202 and 204. The interconnected plates 202, 204 cooperatively define a central hub 206 having a hexagonal drive opening 208 therethrough. As illustrated in FIG. 10, a rotatable drive shaft 210, identical with previously described shaft 124, extends into the opening 208 in order to rotate wheel 200 by means of motor 64 and gear box 66. To this end, a hub plate 212 also forms a part of the drive assembly for the wheel 200.

The overall wheel 200 includes an outermost rim 214, a total of eight elongated ribs 216 which extend from central hub 206 to rim 214, and a circular reinforcing ring 218 between hub 206 and rim 214. It will be observed that the ribs 216 lie along respective, non-diameter chord lines 220 (FIG. 11) which are equally spaced about the wheel 200. In this fashion, the wheel 200 presents a series of eight somewhat triangular inner openings 222 between central hub 206 and reinforcing ring 218, and eight larger, generally quadrate openings 224, each outboard of an opening 222 and located between ring 218 and rim 214.

In more detail, it will be seen that plates 202 and 204 are in face-to-face contact, and are interconnected by means of screws 226. As best illustrated in FIGS. 13-16, the lower wheel plate 204 has a reduced thickness downwardly extending circular contact lip 228 forming apart of rim 214; likewise, the lower extents of the ribs 216 are of reduced thickness. Stated otherwise, the thickness of the lower edge of the lower plate 204 is thinner than the thickness of the upper edge of the upper plate 202. These features serve to reduce the friction between the wheel 200 and the underlying structure of assembly 22, while also providing sufficient mechanical strength for the wheel.

As explained previously, the wheel 200 is an alternate design, which is fully compatible with the components of assembly 22. This is best illustrated in FIG. 17, which depicts the weldments 71 defining the through-openings 96, 98 serving as seed entrance openings for the wheel 200.

The operation of wheel 200 is exactly as previously described in connection with wheel 100. During such operation. At virtually every instant over a given period of time, the wheel 200 presents effective through-openings of substantially constant area, and in no instance is there a wholly unobstructed seed flow path through the wheel 200.

We claim:

1. A seed metering wheel assembly operable to deliver a substantially constant flow of seed over a time period and comprising:

- a hopper assembly including a seed outlet opening of predetermined shape and size, said hopper assembly operable to hold a supply of seeds and to deliver by gravitation quantities of the seed to said seed outlet opening over said time period;
- a seed metering wheel assembly located beneath said seed outlet opening and oriented to receive said quantities of seed and to create an output flow of seeds, said seed metering wheel assembly including a seed metering wheel rotatable about an upright axis and having a plurality of circumferentially spaced apart seed metering openings therethrough and defined by corresponding rib sections,
- said rib sections and openings oriented to present a substantially constant open area beneath said seed outlet opening over said period of time, with at least certain portions of said seed metering opening-defining ribs extending across said seed outlet opening over said period of time, in order to prevent wholly unobstructed flow of seeds from said seed outlet opening through the seed metering wheel assembly, said rib section and opening further oriented to provide a substantially constant weight and volumetric flow of seed from the seed metering wheel assembly during said period of time; and
- structure supporting said seed metering wheel assembly in a stationary condition preventing translation of the seed metering wheel assembly during said period of time.

2. The assembly of claim 1, said hopper including a pair of opposed seed outlet openings.

3. The assembly of claim 1, at least certain of said seed metering openings being of a size different than the size of others of the seed metering openings.

4. The assembly of claim 1, said seed metering openings being located in substantially circular arrays, with the openings of each array being of a size different than the openings in an adjacent array.

5. The assembly of claim 4, said seed metering openings being located in respective, first, second, and third circular arrays each having identically sized openings within the arrays, the openings of said first array being adjacent the rotational axis of the seed metering wheel, the openings of said second array being larger than the openings of the first array and located outboard of the first array, and the openings of said third array being larger than the openings of the second array and located outboard of the second array.

6. The assembly of claim 1, there being a seed leveling device adjacent said hopper outlet and above said seed metering wheel assembly in order to successively level the upper surfaces of quantities of seed entering said seed wheel metering assembly.

7. The assembly of claim 6, said seed leveling device comprising a brush adjacent said seed outlet opening.

8. The assembly of claim 1, including a plate assembly disposed across said seed outlet openings, said plate assembly having a plurality of seed passageways therethrough, said plate assembly located beneath said seed metering openings for passage of said flow of seeds from the seed metering wheel assembly.

9. The assembly of claim 8, said seed passageways including a pair of relatively large, opposed passageways.

10. The assembly of claim 1, said ribs oriented along respective non-diameter chords of said rotatable seed metering wheel.

11. A rotatable seed metering wheel assembly comprising:
a metering wheel having a central hub section, a circular rim outboard of said central hub section, and a series of ribs extending between said central hub section and said rib and defining through-openings, said ribs lying along respective, spaced apart, non-diameter chord lines,
said metering wheel further including an intermediate ring between said central hub section and said rim, there being a first series of generally triangular through-openings between said central hub section and said intermediate ring, and a second series of generally quadrate through-openings between said intermediate rings and said rim; and
apparatus for rotation of said metering wheel about an upright axis.

12. The seed metering wheel assembly of claim 11, said metering wheel including a pair of face-to-face, upper and lower, interconnected plates, with the thickness of the lower edge of the lower plate being thinner than the thickness of the upper edge of the upper plate.

13. A method of metering quantities of seed in order to create a substantially constant flow of seed over a period of time, said method comprising the steps of:

delivering by gravitation quantities of seed from a seed outlet opening to a metering station; and at said metering station, successively passing said quantities of seed through a series of seed metering openings defined by corresponding rib sections and rotating about a central, upright axis, so that the rib sections and seed metering openings present a substantially constant open area over said period of time, with at least certain portions of the seed metering opening-defining ribs extending across said seed metering openings in order to prevent wholly unobstructed flow of seeds from said outlet opening and through said seed metering openings over said period of time, and to provide a substantially constant weight and volumetric flow of seed from the seed metering wheel assembly during said period of time, said metering station being stationary against translation during said passage of said seed during said period of time.

14. The method of claim 13, at least certain of said seed metering openings being of a size different than the size of others of the seed metering openings.

15. The method of claim 13, said seed metering openings being located in substantially circular arrays, with the openings of each array being of a size different than the openings in an adjacent array.

16. The method of claim 15, said seed metering openings being located in respective, first, second, and third circular arrays each having identically sized openings within the arrays, the openings of said first array being adjacent the rotational axis of the seed metering openings, the openings of said second array being larger than the openings of the first array and located outboard of the first array, and the openings of said third array being larger than the openings of the second array and located outboard of the second array.

17. The method of claim 13, including the step of leveling the upper surfaces of quantities of seed above said seed metering openings.

18. The method of claim 17, said leveling step comprising the step of brushing the upper surfaces of said quantities of seed.

19. The method of claim 13, there being a first series of generally triangular seed metering openings proximal to said rotational axis, and a second series of generally quadrate seed metering openings outboard of said first series of openings.

* * * * *